March 5, 1935. H. V. NYE 1,993,720
REGULATING SYSTEM
Filed Feb. 8, 1933
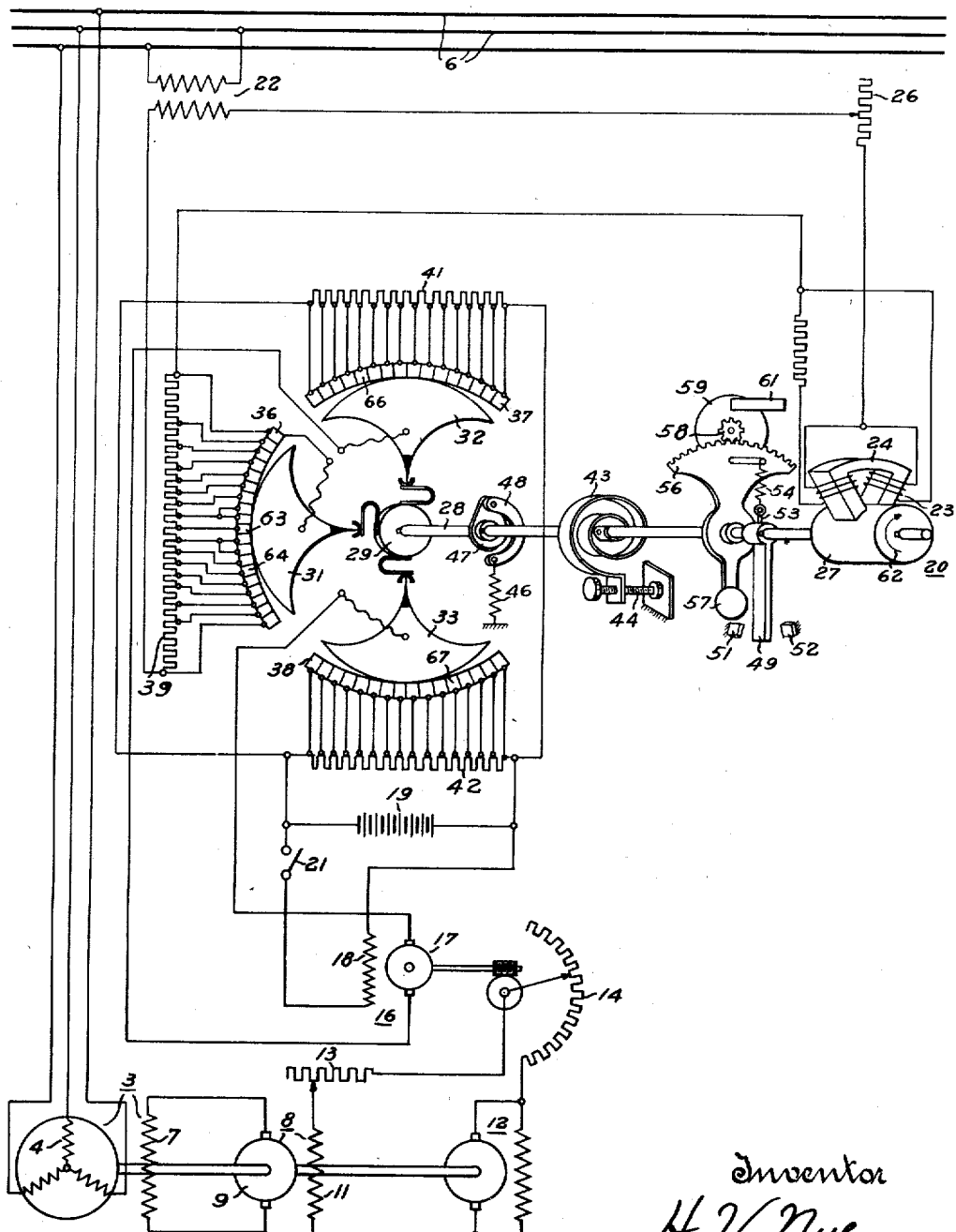

Patented Mar. 5, 1935

1,993,720

UNITED STATES PATENT OFFICE 1,993,720

REGULATING SYSTEM

Henry V. Nye, West Allis, Wis., assignor to Allis-Chalmers Manufacturing Company, Milwaukee, Wis., a corporation of Delaware Application February 8, 1933, Serial No. 655,689

10 Claims. (Cl. 171—229)

This invention relates to improvements in electric regulating systems and more particularly to systems employing a device directly responsive to the quantity to be regulated to thereby control the operation of another device actuated from an independent source of energy and controlling the quantity to be regulated.

It is well known to control the operation of a regulating device such as a motor operated field rheostat or a motor operated throttle in the supply line of a prime mover by means of a pilot regulator operating upon variation from the normal value thereof of a certain quantity to be regulated. The operation of the regulating device is then simply initiated, stopped and reversed by the pilot device, but no control is obtained of the speed of operation of the regulating device in dependence upon the degree of action desired for such device, which generally is dependent upon the degree of variation of the quantity to be regulated. Control of the speed of operation of the regulating device is, however, desirable in systems such as a voltage regulating system for an electric machine in which it is advantageous to operate a motor driven field rheostat at high speed when a large change in the field current is required so as to insure reasonable uniformity of the voltage of the machine, and to operate such rheostat at low speed when only a small change in the field current is required so as to prevent over-travel and oscillatory operation of the rheostat. By providing the system with a pilot device giving a gradually variable energization of the driving means for the regulating device in dependence upon the variation of the quantity to be regulated, the regulating device will operate at different speeds depending upon the variation of the quantity to be regulated and hence depending upon the degree of regulation to be obtained.

It is accordingly among the objects of the present invention to provide a regulating system employing a pilot device giving a gradual control of the energization of the driving means of the regulating device.

Another object of the present invention is to provide a regulating system employing a pilot device for energizing the driving means of a regulating device in dependence upon the magnitude of the variation of the quantity to be regulated.

Another object of the present invention is to provide a regulating system employing a pilot device for energizing the driving means of a regulating device depending on the degree of action required for the regulating device.

Another object of the present invention is to provide a regulating system employing a pilot device for energizing the driving means of a regulating device in a relation other than proportionally to the degree of action required for the regulating device.

Another object of the present invention is to provide a regulating system for an electric machine employing a pilot regulator giving a gradual control of the energization of the driving motor of the main regulator.

Objects and advantages other than those above set forth will be apparent from the following description when read in connection with the accompanying drawing which diagrammatically illustrates one embodiment of the present invention consisting of a voltage regulator for an alternating current generator in which a pilot regulator energizes the motor of the main regulator at a voltage depending upon the departure of the generator voltage from the normal value thereof.

Referring more particularly to the drawing by characters of reference, reference numeral 3 generally designates an alternating current generator driven by a suitable prime mover (not shown) and having an armature 4 energizing an alternating current line 6 and a field winding 7 energized from an exciter 8. Exciter 8 may be mounted on the shaft of the generator and is provided with an armature 9 which is preferably directly connected with field winding 7. The field winding 11 of exciter 8 is preferably energized from a pilot exciter 12 mounted on the generator shaft and the excitation thereof is adjusted by means of a hand operated rheostat 13 and a motor operated regulating rheostat 14. Rheostat 14 is adjusted by the operation of a motor 16 having a field winding 18 energized at a constant voltage from a suitable source such as a battery 19 over a control switch 21 and an armature 17 variably energized from battery 19 as will appear hereinafter.

The system controlling the variable energization of the armature 17 is energized in response to the voltage of line 6 by way of suitable means such as potential transforn.er 22. The control system comprises a driving system 20 of the induction type constituted by a stator 24 carrying a split phase winding 23 energized from transformer 22 over a rheostat 26 and over a circuit to be further described hereinafter. Stator 24 acts by magnetic induction on a rotor 27 preferably formed as a hollow drum of copper or of aluminum which may enclose a fixed core of magnetic material to provide a closed magnetic circuit for the magnetic flux of stator 24. Drum 27 is fixedly mounted on a spindle 28 which is supported by suitable bearings (not shown). Stator 24 and rotor 27 thus constitute an electric motor of the induction type and rotor 27 tends to rotate in a direction indicated by the arrow 62, the torque tending to produce such rotation being substantially proportional to the square of the voltage of line 6. A regulating system is a portion of the motor control system and is formed by a hub 29 fixedly mounted on spindle 28 and supporting a plurality of rocking sectors 31, 32 and 33 associated with a plurality of arcuate contact paths 36, 37 and 38 each formed by a plurality of conductive segments separated by suitable insulation. The different segments of contact path 36 are severally connected with connection points of a resistance 39 inserted in the circuit of winding 23. Sector 31 is conductively connected with one end segment of conductive path 36 and thus short circuits a variable portion of resistance 39 in dependence upon the position of spindle 28. As is well known, the voltage impressed between adjacent segments of a contact path such as 36 is subject to limitations due to the necessity of avoiding arcing upon movement of the sector from one segment to another, the permissible voltage between adjacent segments being in more or less inverse relation with the amount of current carried by the resistance. In general the amount of current taken by winding 23 is very small so that the voltage between adjacent segments of path 36 need not be maintained at a low value. It is thus possible to distribute the taps of resistance 39 in any desired manner so as to include between adjacent taps any desired portion of resistance 39.

Contact paths 37 and 38 are connected with resistances 41 and 42 energized from battery 19 and sectors 32 and 33 are utilized for impressing a portion of such voltage on armature 17 of the rheostat motor 16. The amount of current taken by armature 17 is in general much larger than the current taken by winding 23 so that it is desirable to connect the several segments of contact paths 37 and 38 with equal portions of resistances 41 and 42 so as to maintain the voltage drop between adjacent segments at a minimum value. The movement of spindle 28 is restrained by a suitable spring 43, the fixed end of which may be adjusted by means of a screw 44. The torque of spring 43 is proportional to the deflection given thereto by movement of spindle 28 and is opposed over the range of motion of the spindle by the torque of a second spring 46 acting on spindle 28 through a crank 47 and an arcuate link 48. Springs 43 and 46, crank 47 and link 48 are so dimensioned as to impress on spindle 28 a constant torque in direction opposite to that of arrow 62 over the range of movement of such spindle. Such range is limited by an extension 49 fixedly mounted on the spindle which limits the motion thereof by coming into engagement with one or the other of two stops 51 and 52. The regulator is also preferably provided with a damping system to prevent overtravel and oscillating movement thereof, such system comprising an extension 53 mounted on spindle 48 and resiliently connected by means of a spring 54 with a toothed sector 56 rotatably mounted on the spindle. Sector 56 is balanced by a counterweight 57 and engages with a pinion 58 driving a metallic disk 59 between the poles of a magnet 61.

In operation, assuming that the voltage of line 6 is at the normal value thereof, screw 44 and rheostat 26 are so adjusted that the pilot regulator is in the position shown in the drawing, that is, with sector 31 resting on the middle segment 63 of contact path 36. The torque exerted by motive system 20 in the direction of arrow 62 is then exactly balanced by the torque exerted in opposite direction by the combined action of springs 43 and 46. Sectors 32 and 33 are then in contact with the median segments of contact paths 37 and 38 and therefore are at the same potential, so that armature 17 of motor 16 receives no current; upon closure of switch 21, the regulator motor 16 will, therefore, not be set in motion. If the voltage of line 6 drops below the normal value thereof, the current received by winding 23 from transformer 22 decreases and the torque exerted by motive system 20 decreases in an even larger proportion. Spindle 28 then rotates in a direction opposite to that of arrow 62 until sector 31 comes into contact with a segment of contact path 36 such as 64. The motion of spindle 28 will cease when rocking of sector 31 has short circuited an additional amount of resistance 39 such that the current in winding 23 again reaches the normal value thereof. The torque of motive system 20 then again reaches the value of the combined torques of springs 43 and 46, thereby causing spindle 48 to come to rest. Sectors 32 and 33 are then in contact with segments such as 66 and 67 and impress on armature 17 of motor 16 the difference between the voltages of such segments. Motor 16 then rotates and moves rheostat 14 in such a manner as to decrease the resistance of the field circuit of exciter 8, thereby permitting the flow of a larger exciting current in winding 11. A larger amount of current then flows in field winding 7, thereby causing the voltage of line 6 to return to the normal value thereof.

It will be understood that if the voltage of line 6 is greater than normal the operation of the system will be similar to that described above. The variations occurring in the voltage of line 6 are usually not of uniform magnitude but, irrespective to the magnitude of such variation, spindle 28 always takes a position that will cause sector 31 to regulate the amount of resistance 39 in the circuit of winding 23 to restore the current in such winding to the normal value thereof. The position at which spindle 28 comes to rest is thus determined both by the magnitude of the variation of the voltage of line 6 and by the manner in which the segments of contact path 36 have been connected with resistance 39. Such connections may be made in many different manners but will be preferably so made that, upon departure of the voltage of line 6 from its normal value by a small amount, rocking of sector 31 to the extent of one segment of path 36 changes the resistance of the circuit of winding 23 to a sufficient extent to cause the current in winding 23 to return to the normal value thereof. Sectors 32 and 33 then impress a very small voltage on armature 17 thereby causing rheostat 14 to be operated at a very low speed. When the voltage of line 6 is restored to the normal value thereof spindle 28 returns to the position shown without overtraveling or oscillating. The connections of resistance 39 are also preferably so made that, upon variation of the voltage of line 6 from its normal variation of the voltage of line 6 from its normal value by an extent slightly greater than the extent considered above, spindle 28 will rotate to a much larger extent which may reach the extent limited by engagement of extension 49 with stop 51 or 52. Sectors 32 and 33 then impress on armature 17 a voltage which may reach the full value of the voltage of battery 19 so that motor 16 then operates rheostat 14 at the maximum speed thereof. The voltage of line 6 is thus rapidly returned to a value which differs from the normal value thereof by only a small amount. Spindle 28 then returns towards the median position thereof thereby returning sectors 32 and 33 to a position in which such sectors reduce the voltage impressed on armature 17 to a value which is a small fraction of the voltage of battery 19 thereby causing motor 16 to drive rheostat 14 at a low speed to bring the voltage of line 6 to exactly the normal value thereof. When such normal value is reached spindle 28 returns to the position shown and motor 16 stops.

From the above it will appear that the system provides for the control of a motor operated rheostat which is gradual and varied in dependence upon the degree of departure of the voltage to be regulated from the normal value thereof. By inserting, in the energizing circuit of the pilot regulator, a variable amount of resistance controlled by the regulator itself, the motion of the regulator may be in any arbitrary relation with the variation of the voltage to be regulated while utilizing, in the construction of the pilot regulator, only constructive elements which otherwise would provide only a proportional relation between such quantities.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine.

2. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine, said regulator comprising a motive system and a regulating system controlling the direction and speed of operation of the motive system.

3. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine, said regulator comprising a motive system, a manually operable rheostat for adjusting the potential applied to the motive system, and a rheostat adjusted by and connected for controlling the direction and speed of operation of the motive system.

4. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine, said regulator comprising an induction motor producing a torque dependent in magnitude on the energization of the machine, a manually operable rheostat for initially adjusting the potential applied to the regulator motor and a rheostat adjusted by and connected for cooperating with the manually operable rheostat to control the direction and speed of operation of the regulator motor.

5. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine, said regulator comprising an induction motor producing a torque dependent in magnitude on the energization of the machine, adjustable means opposing the torque of the motor, a manually operable rheostat for initially adjusting the potential applied to the regulator motor and a rheostat adjusted by and connected for cooperating with the manually operable rheostat to control the direction and speed of operation of the regulator motor.

6. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine, said regulator comprising an induction motor producing a torque dependent in magnitude on the energization of the machine, a manually operable rheostat for initially adjusting the potential applied to the regulator motor and a rheostat adjusted by and connected for cooperating with the manually operable rheostat to control the direction and speed of operation of the regulator motor, the last mentioned rheostat being divided into unequal portions to secure non-linear action thereof on the potential applied to the regulator motor.

7. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connection of the pair of rheostats with the motor in response to variations in the operation of the machine, said regulator comprising an induction motor producing a torque dependent in magnitude on the energization of the machine, a manually operable rheostat for initially adjusting the potential applied to the regulator motor and a rheostat adjusted by and connected for cooperating with the manually operable rheostat to control the direction and speed of operation of the regulator motor, the last mentioned rheostat being divided into unequal portions similarly arranged and extending in opposite directions from the central portion thereof to secure varying action on the potential supplied to the regulator motor.

8. In a system for controlling the operation of a variably energized dynamo electric machine, the combination of a rheostat connected with and controlling the degree of energization of the machine, a motor for adjusting the rheostat and a pair of rheostats arranged in potentiometer connection for controlling the speed of operation and the direction of rotation of the motor; with a regulator for adjusting the connections of the pair of rheostats with the motor in response to variations in the operation of the machine, said regulator comprising an induction motor producing a torque dependent in magnitude on the energization of the machine, a plurality of springs exerting a constant torque in opposition to the torque of the regulator motor, a manually operable rheostat for initially adjusting the potential applied to the regulator motor and a rheostat adjusted by and connected for cooperating with the manually operable rheostat to control the direction and speed of operation of the regulator motor.

9. In a system for controlling the operation of a variably energized dynamo electric machine, the combination of a rheostat connected with and controlling the degree of energization of the machine, a motor for adjusting the rheostat and a pair of arcuate rheostats arranged in potentiometer connection for controlling the speed of operation and the direction of rotation of the motor; with a regulator for adjusting the connections of the pair of rheostats with the motor in response to variation in the operation of the machine and comprising a motive system operating a plurality of sector contacts rocking in contact with the pair of rheostats.

10. In a system for controlling the operation of a variably energized dynamo electric machine, the combination of a rheostat connected with and controlling the degree of energization of the machine, a motor connected with the rheostat for adjusting the same and a pair of arcuate rheostats arranged in voltage dividing connection and connected with the motor for controlling the speed of operation and the direction of rotation thereof; with a regulator for adjusting the connections of the pair of rheostats with the motor in response to variation in the operation of the machine and comprising a motive system, a rheostat controlling the direction and speed of operation of the motive system and a plurality of sector contacts operated by the motive system and severally engaging the pair of rheostats and the last mentioned rheostat.

HENRY V. NYE.

CERTIFICATE OF CORRECTION.

Patent No. 1,993,720.                        March 5, 1935.

HENRY V. NYE.

It is hereby certified that error appears in the printed specification of the above numbered patent requiring correction as follows: Page 3, first column, lines 51 and 62, second column, lines 1, 18, 38 and 59, and page 4, first column, lines 7 and 32, and second column, line 12, claims 1, 2, 3, 4, 5, 6, 7, 8, and 9 respectively, for the words "for adjusting" read connected with; page 3, first column, lines 51 and 62, second column, lines 1, 19, 38, and 59, and page 4, first column, lines 7-8 and 32-33, and second column, line 12, claims 1 to 9 inclusive, after "rheostat" insert the words for adjusting the same; page 3, first column, lines 52 and 63, second column, lines 2, 20, 40 and 60-61, and page 4, first column, lines 8-9 and 33-34, and second column, line 14, claims 1 to 9 inclusive, for "potentiometer" read voltage dividing; page 3, first column, lines 52-53 and 63-64, and second column, lines 2-3, 20, 40, and 61, and page 4, first column, lines 9 and 34. and second column, line 14, claim 1 to 9 inclusive, after "connection" insert the words and connected with the motor; page 3, first column, lines 34 and 65, second column, lines 4, 22, 42, and 62-63, and page 4, first column, lines 10-11 and 35-36, and second column, line 16, claims 1 to 9 inclusive, for "of the motor" read thereof; and that the said Letters Patent should be read with these corrections therein that the same may conform to the record of the case in the Patent Office.

Signed and sealed this 25th day of June, A. D. 1935.

(Seal)                                                     Bryan M. Battey
                                                         Acting Commissioner of Patents.